United States Patent [19]

Duron

[11] Patent Number: 5,491,704
[45] Date of Patent: Feb. 13, 1996

[54] INTERACTIVE LASER DISC SYSTEM

[75] Inventor: James R. Duron, Dana Point, Calif.

[73] Assignee: Quantum Lerning Systems, Inc., Ocala, Fla.

[21] Appl. No.: 140,264

[22] Filed: Oct. 21, 1993

[51] Int. Cl.[6] .......................... H03M 13/00; G11B 5/04; G11B 15/52; H04N 5/76

[52] U.S. Cl. .......................... 371/40.1; 369/48; 369/58; 369/50; 358/342; 358/338

[58] Field of Search .................................. 369/48–50, 47, 369/54, 58; 358/342, 335; 360/27; 371/40.1

[56] References Cited

U.S. PATENT DOCUMENTS

| | | |
|---|---|---|
| 4,558,375 | 12/1985 | Sontheimer .............................. 358/342 |
| 4,789,974 | 12/1988 | Satoh et al. ................................ 369/45 |
| 5,161,034 | 11/1992 | Klappert .................................. 358/342 |
| 5,257,253 | 10/1993 | Otsubo et al. ............................ 369/48 |

*Primary Examiner*—Roy N. Envall, Jr.
*Assistant Examiner*—Emmanuel L. Moise
*Attorney, Agent, or Firm*—Roy A. Ekstrand

[57] ABSTRACT

An interactive laser disc system includes a conventional laser disc player having a laser disc supporting a plurality of data segments each having instruction data and event data. The instruction data is repeated in triplicate and is processed by a comparator to determine instruction data reliability using a matching two out of three criteria. A controller operates the laser disc player to present an option screen to the user while storing the event data needed to respond immediately to the user's selection. The use of the memory and controller avoids the need of using a central processing unit and reading of the entire laser disc.

16 Claims, 9 Drawing Sheets

INTERACTIVE LASER DISC SYSTEM

FIELD OF THE INVENTION

This invention relates generally to laser disc systems and particularly to those configured for interactive operation.

BACKGROUND OF THE INVENTION

The advent of systems generally referred to as a laser disc system has provided a very powerful and convenient information storage and transfer capability. Laser disc systems provide an extremely convenient and powerful format for storing and later retrieving information such as audio/video information as well as digitally encoded data such as stored text material. The basic laser disc storage medium is similar in appearance to the ubiquitous phonograph record used in audio systems.

A substantial variety of laser disc systems have been developed by practitioners in the art which differ significantly in their capability and power. However, all such laser disc systems share the basic technology in which a plurality of reflective surface modulated tracks are formed upon the laser disc and used in combination with a reading and sensing mechanism to recover the stored information. The information on the laser disc is recovered as the laser player unit illuminates the spinning disc while the sensor portion responds to the reflected laser illumination to produce corresponding electrical signals. Laser disc systems are capable of storing both analog type information as well as digitally encoded information or data.

Initially, laser disc systems found their greatest consumer acceptance in "player" type devices which forms passive units suitable for receiving and playing stored analog information such as audio or video programs, movies or other passive entertainment type information. As the technology progressed, however, consumer demand for so-called interactive "systems" prompted practitioners in the art to endeavor to impart additional capability and power to laser disc systems. In a typical interactive system, the user periodically selects a "path" through a plurality of alternative paths and branches within the various stored information segments on the disc. In most systems, the user is presented with a selection menu or other response soliciting mechanism to which the user responds by inputting a user selection. In many systems, the user response is inputted using a remote control apparatus similar to that presently utilized in controlling television receivers, video cassette recorders and stereophonic audio systems. Once the user has provided a selection input, the laser disc system then displays and carries forward a corresponding sequence of audio/video events. This process is repeated allowing the user to periodically "interact" with the system and provide control of the total information display.

Interactive laser disc systems provide a great potential for entertainment as well as educational and industrial use. However, such interactive systems produced to date have been generally complex and expensive and, as a result, have not become widespread consumer items in the manner enjoyed by other devices such as television receivers, radios and personal computers or the like. Thus far, most interactive laser disc systems are too costly and complex for general consumer use and thus have found their greatest acceptance in the relatively limited fields of commercial information, industrial use or educational use.

Despite the problems of complexity and high cost which have thus far limited mass market consumer utilization of interactive laser disc systems, there remains a continuing demand and need in the marketplace for a laser disc interactive system which is low enough in cost and complexity to be used by consumers generally.

SUMMARY OF THE INVENTION

Accordingly, it is a general object of the present invention to provide an improved interactive laser disc system. It is a more particular object of the present invention to provide an improved interactive laser disc system which is sufficiently low in cost and complexity to be utilized within the broad consumer market as well as industrial and educational use.

In accordance with the present invention, there is provided an interactive laser disc system comprises: a laser disc having a plurality of data segments stored thereon each having an instruction data portion and an event data portion, the data segments being associated into groups of alternative user options; a laser disc player having means for receiving the laser disc and recovering the data segments therefrom; a controller having a controller memory for controlling the operation of the laser disc player and for presenting a plurality of user choice options upon the display means and for storing a group of the data segments in the memory; and input means for receiving a user choice from among the options; display means for producing an audio visual display; the controller responding to the user choice to retrieve a corresponding one of the data segments from the controller memory and applying it to the display means thereby providing an interactive display.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
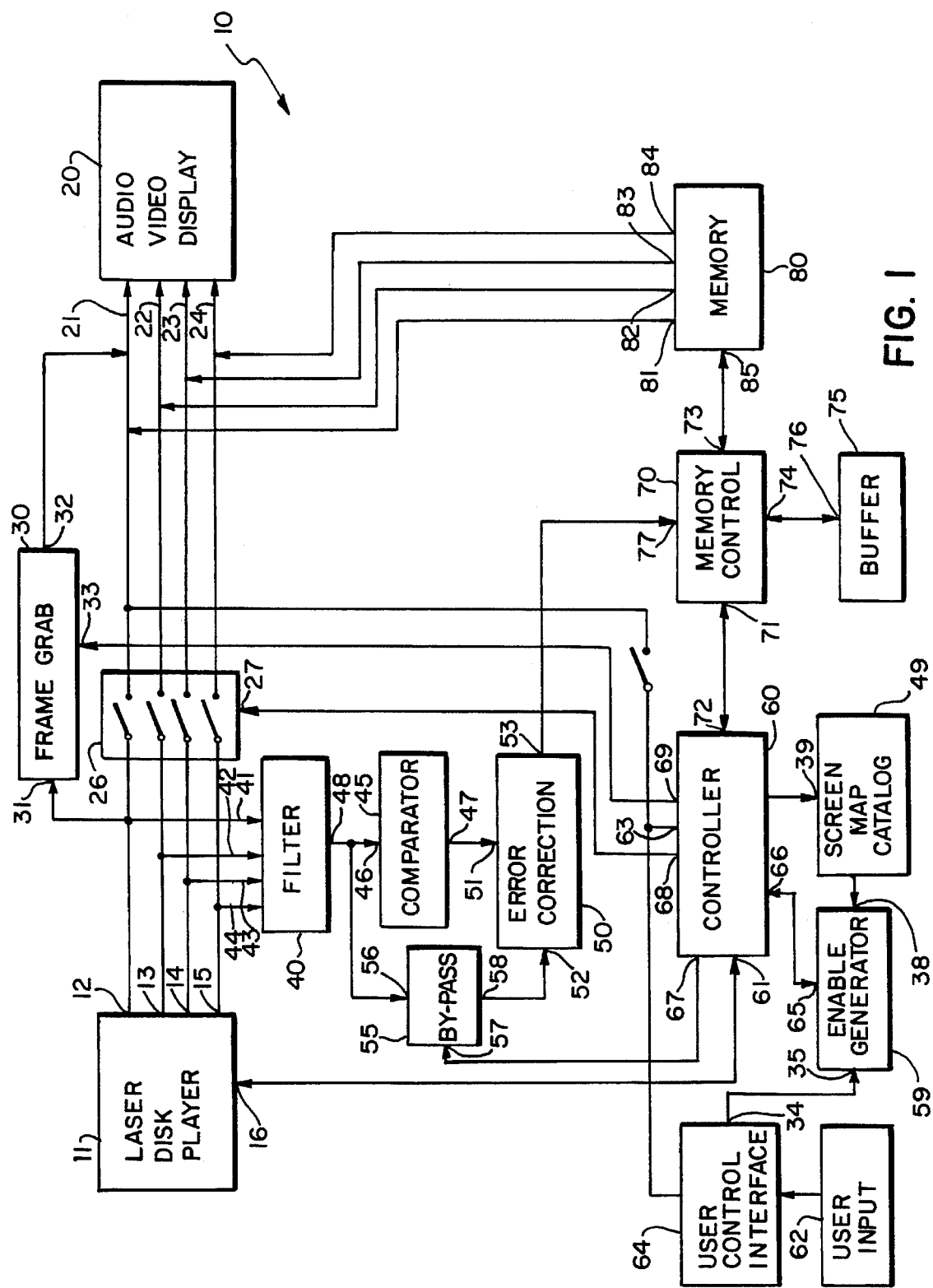
FIG. 1 sets forth a simplified block diagram of the present invention interactive laser disc system.

FIG. 1 sets forth a simplified block diagram of an interactive laser disc system constructed in accordance with the present invention and generally referenced by numeral 10.

Laser disc system 10 utilizes a laser disc player 11 constructed in accordance with conventional fabrication techniques and having a video output 12, a pair of analog outputs 13 and 14, and a digital audio output 15. Laser disc player 11 further includes a microprocessor control input 16. Interactive laser disc system 10 further includes an audio video display 20 constructed in accordance with conventional fabrication techniques and utilizing conventional systems for the presentation of video information on a display such as a cathode ray tube or the like and audio information through conventional transducers such as speakers or the like. Audio video display 20 includes a video input 21, a pair of analog audio inputs 22 and 23, and a digital audio input 24. A switching matrix 26 couples outputs 12 through 15 of laser disc player 11 to inputs 21 through 24 of audio video display 20. A conventional frame grabber 30 includes an input 31 coupled to output 12 of laser disc 11, an output 32 coupled to input 21 of audio video display 20, and a control input 33. A filter 40 constructed in accordance with the present invention includes a plurality of inputs 41, 42, 43 and 44 coupled to outputs 12, 13, 14 and 15 respectively of laser disc player 11. Filter 40 further includes an output 48. A comparator 45 constructed in accordance with the present invention and described below in greater detail includes an input 46 coupled to output 48 of filter 40 and an output 47. An error correction circuit 50 constructed in accordance with conventional fabrication techniques includes an input 51 coupled to output 47 of comparator 45, an output 53, and an input 52. A bypass circuit 55 includes an input 56 coupled to output 48, an output 58 coupled to input 52 of error correction circuit 50 and a control input 57. Bypass 55 comprises a conventional switching arrangement operative to couple output 48 of filter 40 directly to input 52 of error correction circuit 50.

A controller 60 constructed in accordance with the present invention as set forth below in greater detail includes an input 61 coupled to microprocessor input 16 of laser disc player 11, an input 63 coupled to a user control interface 64, and a pair of outputs 68 and 69. Output 68 is coupled to control input 27 of switching matrix 26 while output 69 is coupled to input 33 of frame grabber 30. Controller 60 further includes a bidirectional coupling 66 coupled to a bidirectional coupling 65 of an enable generator 59. An output 67 couples controller 60 to input 57 of bypass 55. A screen map catalog 49 includes an input 39 coupled to controller 60 and an output coupled to an input 38 of enable generator 59. A user input 62 is coupled to a user control interface 64 which in turn includes an output 34 coupled to input 35 of enable generator 59.

A memory control 70 includes a bidirectional coupling 71 coupled to coupling 72 of controller 60, an input 77 coupled to output 53 of error correction 50, and a bidirectional coupling 74 coupled to buffer 75 through a bidirectional coupling 76. A controller memory 80 is coupled to input 73 of memory control 70 by a bidirectional coupling 85. Memory 80 further includes a plurality of outputs 81, 82, 83 and 84 coupled to inputs 21, 22, 23 and 24 respectively of audio video display 20.

In operation, laser disc player 11 receives a laser disc (not shown) upon which a plurality of event and instruction data together with video and audio information for data have been stored in a plurality of strings or segments such as those set forth below in FIGS. 5 and 6. As mentioned above, laser disc player 11 is constructed in accordance with conventional fabrication techniques and is controlled through the operation of controller 60. Controller 60 traffics and interprets all instructions and event data within the system and, in accordance with an important aspect of the present invention, utilizes laser disc player 11 as a continuing source of information during the operation of the present invention system. As system 10 is initially activated and laser disc 11 is initially operated, a stored instruction from laser disc player 11 is read from the laser disc and is loaded into controller 60. Thereafter, laser disc player 11 is instructed to stop at a predetermined image frame. The controller instruction stored upon the laser disc includes a series of event identification numbers, memory address flags, and corresponding screen option button identifiers described below in greater detail. Controller 60 executes the instruction transferred from laser disc player 11 and presents an option choice to the user. In its most typical operation, controller 60 activates enable generator 59 together with frame grabber 30 to apply the video information of a selected frame to display 20 together with an on-screen character set which indicates the options available to the user together with a movable cursor generated by enable generator 59. At this point, the present invention system waits for the user to activate user input 62 to provide a selection from available options. The operation of user input 62, user control interface 64, enable generator 59 and screen map 49 are set forth below in FIG. 7. However, suffice it to note here that in its most typical form, user input 62 comprises a remote control input which is coupled to system 10 by a conventional communication link such as infrared input or the like. User input 62 facilitates the user's movement of the cursor upon display 20 to provide the desired selection input.

Once the user has exercised a choice and inputted an option, controller 60 responds by activating memory control 70 to access controller memory 80 and execute the selected event. For example, a selected event may be a series of video image frames previously stored in memory 80 under the control of controller 60 together with appropriate accompanying audio information. Under the operation of memory control 70 and controller 60, the selected event is applied to audio video display 20 and is completed. Once the selected event has been completely transferred from memory 80, controller 70 clears memory 80 waiting for the next input event. At the completion of the selected event, controller 60 causes laser disc player 11 to present a predetermined frame utilizing frame grabber 30 and again activates enable generator 59 to present the next option to the user. This process continues to provide the interactive operation of the present invention system.

In accordance with an important aspect of the present invention, the information stored upon the laser disc within laser disc player 11 is coupled to a filter 40 which comprises a band width filter having an analog to digital converter providing selective filtering of the outputs of laser disc player 11. Alternatively, a digital to digital filter may be used which forms a pattern recognition circuit for other digital information sources. Included within filter 40 is a data bit recognition scheme which is configured to recognize the difference between normal audio video information and instruction data. The output of filter 40 is coupled to bypass 55 and to comparator 45. In accordance with an important aspect of the present invention, the stored information upon the laser disc includes instruction data which is repeated in triplicate together with audio and visual data which is not redundant. Thus, under the operation of controller 60, the output data from filter 40 is alternatively coupled directly to error correction circuit 50 through bypass 55 or coupled to comparator 45 and thereafter applied to error correction circuit 50. Controller 60 activates bypass 55 to distinguish between instruction data and audio and video data. Because audio and video data is not redundant upon the laser disc, it need not be applied to comparator 45 and thus is coupled directly by bypass 55 to error correction 50. Conversely, instruction data is applied initially to comparator 45 for verification of the quality of instruction data recovered from laser disc player 11. It should be noted that information recovered from laser disc players is often subject to various forms of data corruption due, for example, to dirt, grease or scratches upon the laser disc. In the case of audio and video data, this corruption may be tolerated. However, for instruction data, a greater degree of precision and reliability is required. Accordingly, the triplicate instruction data is examined by comparator 45 and a match between at least two of the three triplicate instruction data sets is required by comparator 45 to continue the system operation. In the absence of such a data match, comparator 45 then shuts down the system signalling the user to either clean the laser disc, replay the section to reload the data or maintain the system shutdown. Once the appropriate match is found however the data is applied to error correction circuit 50 for error correction. It should be recalled that error correction circuit 50 may comprise any of the many standard error correction systems available. Once error correction has been achieved, the instruction data and audio video data is coupled to memory controller 70 wherein it is stored within memory 80 under the addressing and control of controller 60.

In accordance with an important aspect of the present invention, interactive laser disc system 10 utilizes a process controller 60 rather than an extensive and therefore costly central processing unit to manipulate the plurality of information strings stored upon the laser disc in a continuing interactive manner which avoids the need for reading the entire laser disc as required by prior art systems. Thus, the present invention system is able to continuously read portions of the laser disc and to temporarily store the various options necessary for presentation in response to user input on an interactive basis. In so doing, the present invention system simulates the operation of highly complex and expensive laser disc interactive systems in which the laser disc player must be substantially enhanced in its capability and therefore its cost. The use of redundant instruction data and the operation of the comparator 45 in achieving data verification through a straight forward matching of instruction data provides a greatly simplified verification system which further enhances the cost effectiveness of the present invention interactive laser disc system.

Figure 2:
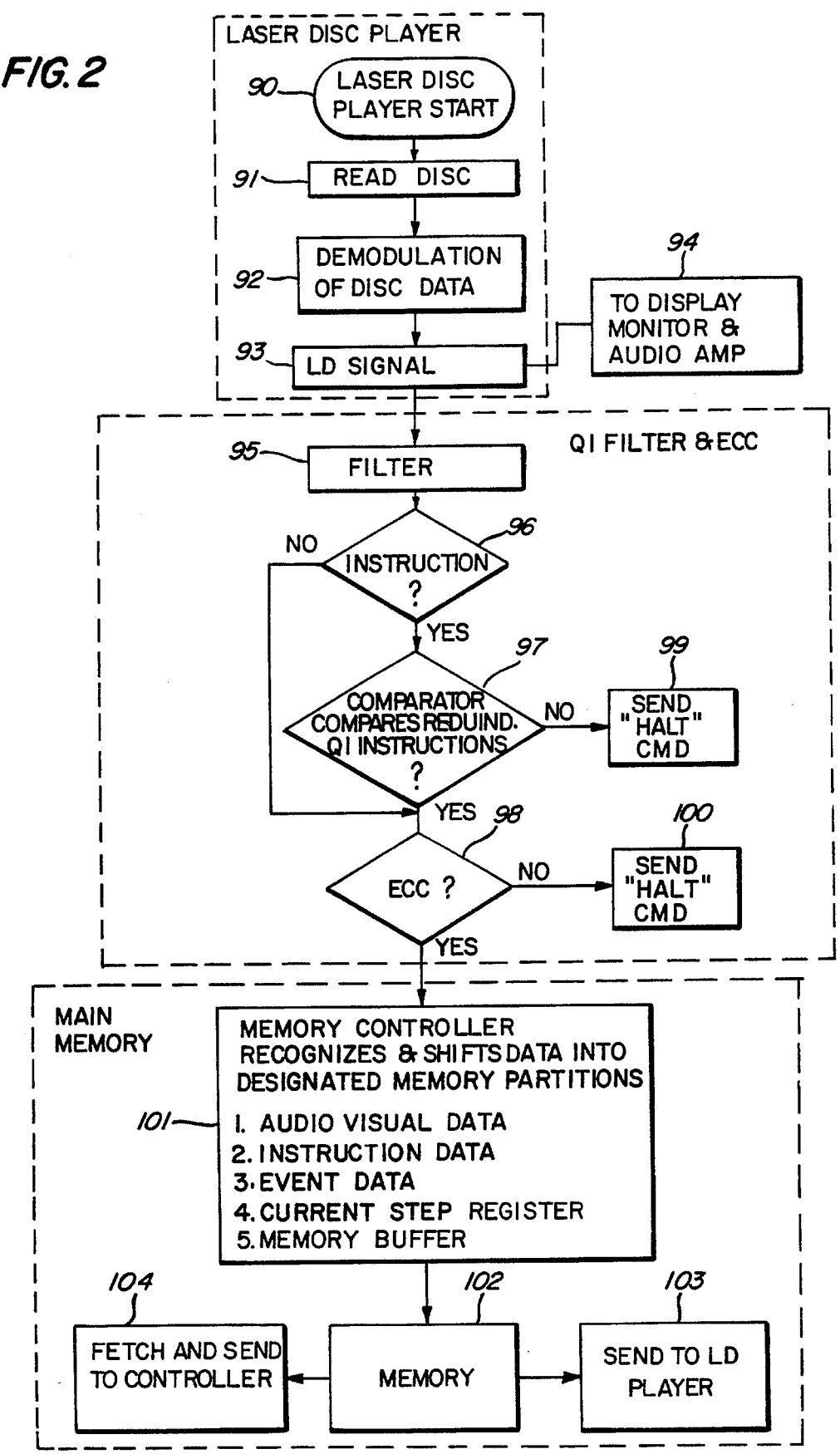
FIG. 2 sets forth a flow chart for the filter and main memory operation of the present invention interactive laser disc system.

FIG. 2 sets forth a simplified flow diagram of the operation of the filter and main memory portions of the present invention system. The system operation is initiated as laser disc player 11 is started at an initial step 90. Thereafter, the laser disc player reads the laser disc at step 91 and demodulates the disc data at step 92. The demodulated disc data produces a laser disc signal at step 93 which is coupled to the display monitor at step 94. The system then moves to step 95 in which the laser disc signal is filtered. Thereafter, the system determines at a decision step 96 whether the laser disc signal comprises instruction data or audio video data. In the event a determination is made at step 96 that the data is instruction data, the system moves to step 97 in which a comparison of redundant instruction data is implemented. If redundant instruction data is not found in step 97, the system moves to step 99 in which a system halt is initiated. If, however, redundant data is found at step 97, the system moves to step 98 in which a conventional error correction operation is carried forward. In the event errors are found at step 98, the system moves to step 100 in which a system halt is implemented. If, however, no errors are found at step 98, the systems moves to step 101.

If a determination is made at step 96 that the data being examined is not instruction data, the system bypasses step 97 and moves directly to step 98 afterwhich error correction evaluation takes place and the system moves to step 101. At step 101, the data is recognized and shifted into designated memory partitions within the system memory and stored within system memory at step 102. From step 102, the system operates under controller actuation to alternatively send data to the laser disc player at step 103 or interchange data with the system controller at step 104.

Thus, in accordance with an important aspect of the present invention, instruction data is examined to determine the necessary redundancy for verification of data reliability and is verified prior to application to the error correction system. In further accordance with the present invention system, the audio and video data is not redundant and is applied directly to the error correction system.

Figure 3A:
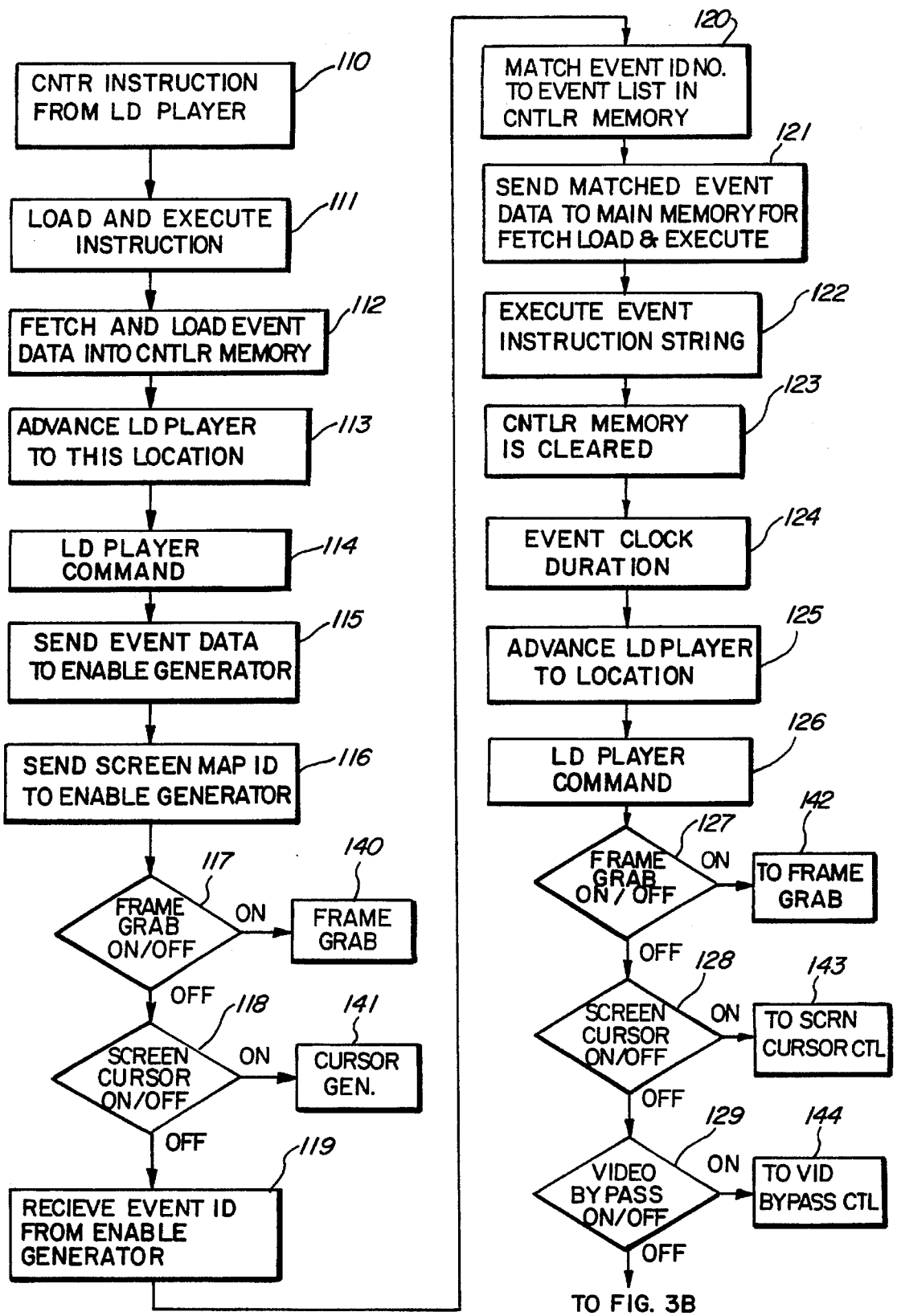
FIG. 3 sets forth a flow diagram of the controller portion of the present invention interactive laser disc system.
Figure 3B:
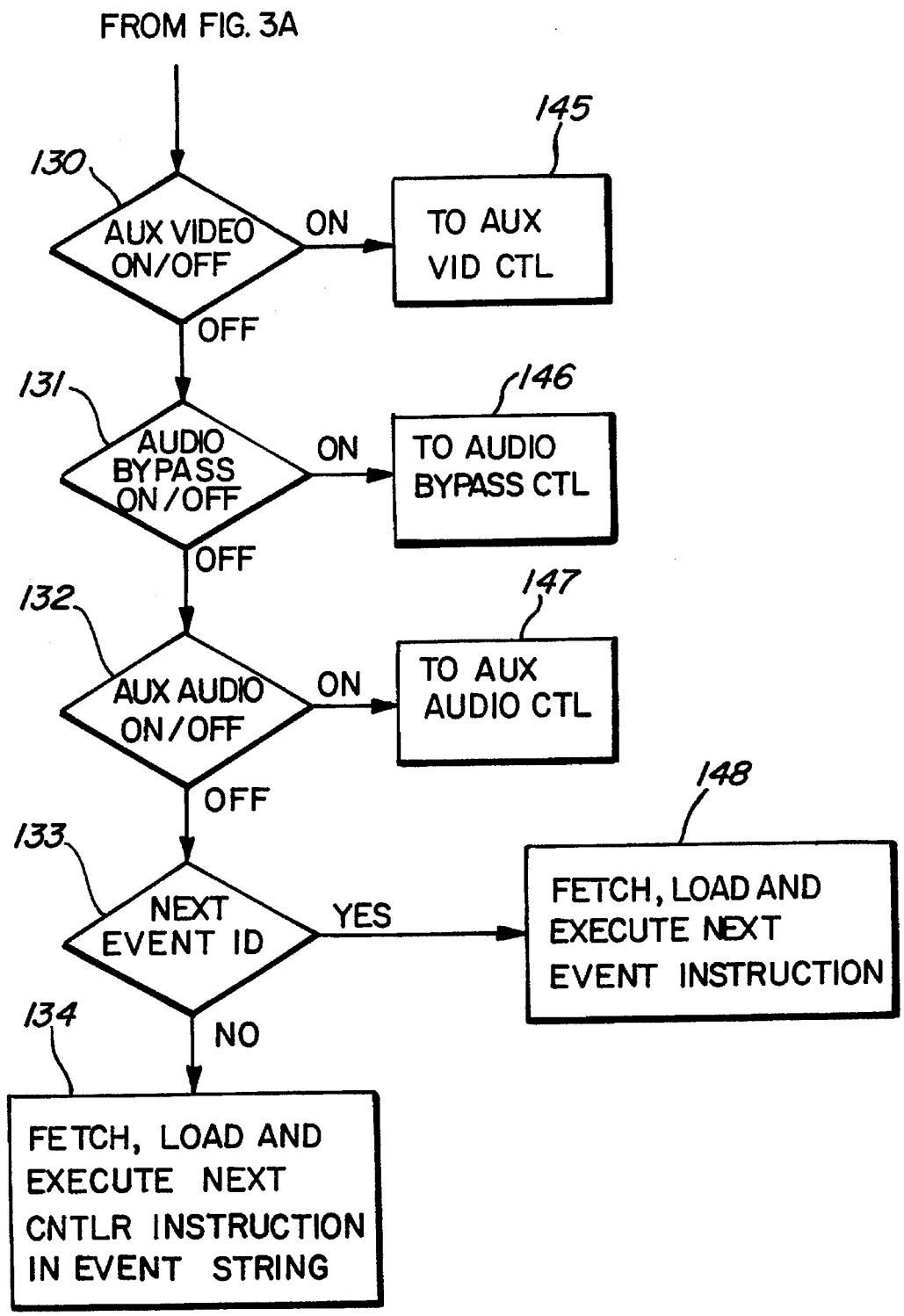

FIG. 3 sets forth a flow diagram of the operation of the controller portion of the present invention interactive laser disc system. Controller operation begins with a step 110 in which controller instructions are received from the laser disc player. Thereafter, at step 111, the controller loads and executes the instruction. At step 112, the event data is loaded into the controller memory and at step 113, the laser disc player is advanced to the appropriate location upon the laser disc corresponding to the event data. Thereafter, at step 114, the laser disc player command is applied to the laser disc and the system moves to step 115 in which event data is transferred to enable generator within character and cursor generator 64 (seen in FIG. 1). The system moves to send the screen map identification to the enable generator. The screen map forms a library of screen maps and is programmable to create interactive screen elements which may also include portions of the laser disc. Thereafter, the system moves to steps 117 and 118 in which a determination is made as to whether the frame grabber or screen cursor are on. In the event the frame grabber is on, the system moves to the operation of the frame grabber at step 140 in which the frame grabber circuit is activated. In the event a determination is made at step 118 that the screen cursor is on, the system moves to a cursor generation step 141. Following steps 117 and 118 in the event both frame grabber and screen cursors are in the off position, the system moves to step 119 in which the event identification is read afterwhich the system moves to a step 120 in which the event identification is matched to the event list within controller memory. At step 121, the system transfers the matched event identification data to the main memory to facilitate the retrieval loading and execution of the event data. At step 122, the event instruction string is executed and at step 123, the controller memory is cleared. Thereafter, the system moves to step 124 in which the event clock is set afterwhich the system moves to step 125 in which the laser disc player is advanced to the appropriate location to read the next required laser disc stored data. At step 126, the laser disc player command is issued to facilitate reading the laser disc. The system then moves to a step 127 in which a determination is made as to whether the frame grabber is on or off. In the event the frame grabber is on, the system moves to step 142 in which the frame grabbing operation is executed. In the event it is determined at step 127 that the frame grabber is off, the system moves to a step 128 in which a determination is made as to whether the screen cursor is on or off. If it is found at step 128 that the screen cursor is on, the system moves to step 143 in which the screen cursor control is operated. If no screen cursor is found on at step 128, the system moves to step 129 in which a determination is made as to whether the video bypass is on or off. If the video bypass is on, the system moves to step 144 in which the video bypass control is actuated. If the video bypass is off, the system moves to a step 130 in which a determination is made as to whether the auxiliary video is on or off. In the event the auxiliary is on, the system moves to step 145 in which the auxiliary video control is actuated. If the auxiliary video is off at step 130, the system moves to step 131 to determine whether the audio bypass is on or off. In the event the audio bypass is on, the system moves to step 146 in which the audio bypass control is actuated. If, however, the video bypass is off, the system moves to step 132 in which a determination is made as to whether the auxiliary audio is on or off. If the auxiliary audio is on, the system moves to step 147 in which the auxiliary audio control is actuated. If, however, it is found at step 132 that the auxiliary audio is off, the system moves to step 133 in which a determination is made as to whether the next event identification is available. If it is found at the next event identification is available, the system moves to step 148 and repeats the retrieval loading and execution of the next event instructions. If, however, it is determined at step 133 that no subsequent event identification is available, the system moves to step 134 in which the next controller instruction in the event string is retrieved, loaded and executed.

Thus, the controller portion of the present invention interactive laser disc system operates to provide interpretation and control of both instruction and event data without resorting to the use of a more expensive and complex central processing unit. The controller repeatedly operates to execute instructions and present options to the user and in receipt of user option choices, executes the appropriate instructions to carry forward the selected event. In this operation, the controller is able to utilize the laser disc as a source of anticipated to-be-needed information to enable the system to respond to user selection without the need for extensive memory beyond that utilized by the controller to temporarily store the possible events within each user choice. The controller then monitors the execution of the selected events and upon completion clears the controller memory and prepares the system for the next controller instruction.

Figure 4A:
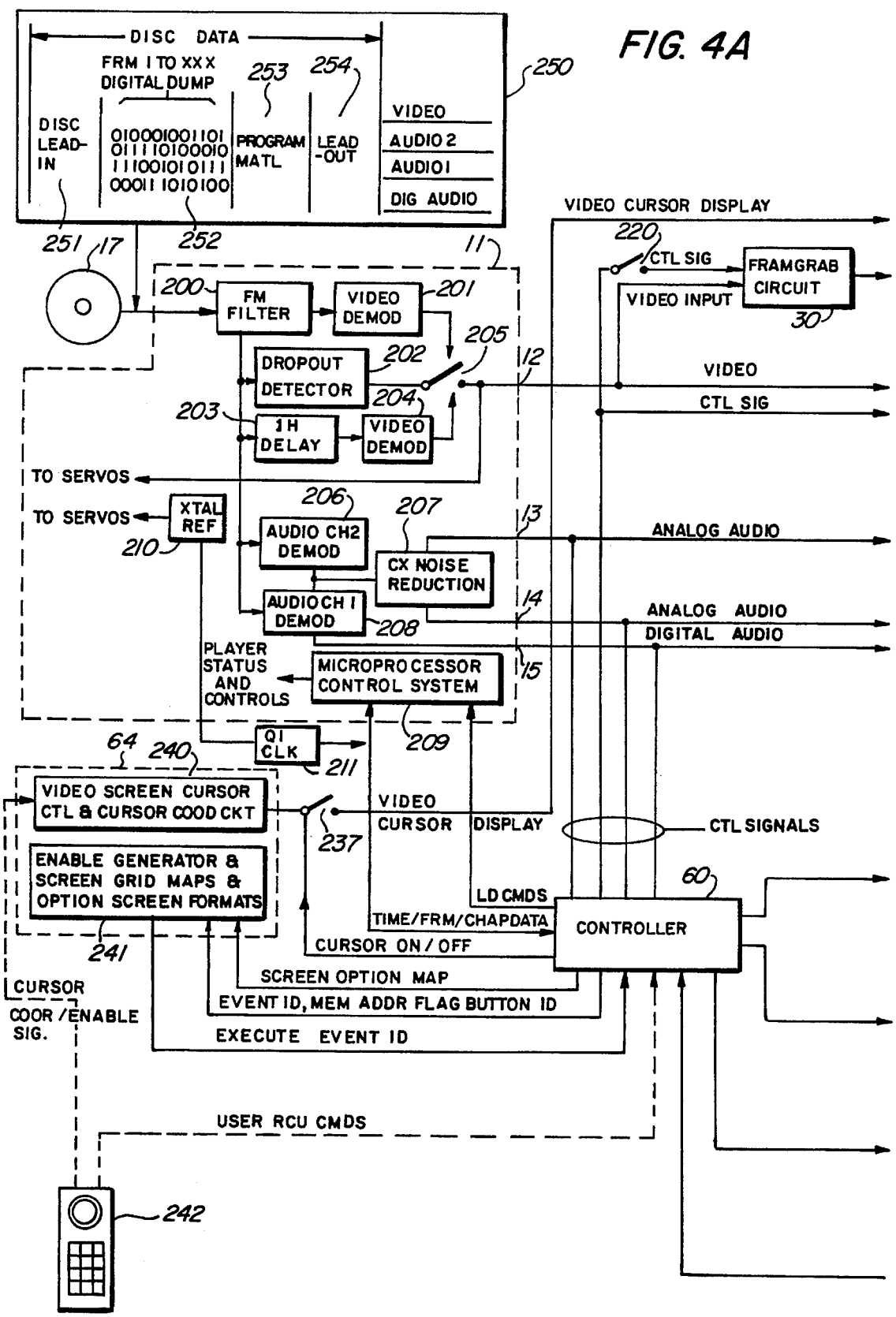
FIG. 4 sets forth a more detailed block diagram of the present invention interactive laser disc system.
Figure 4B:
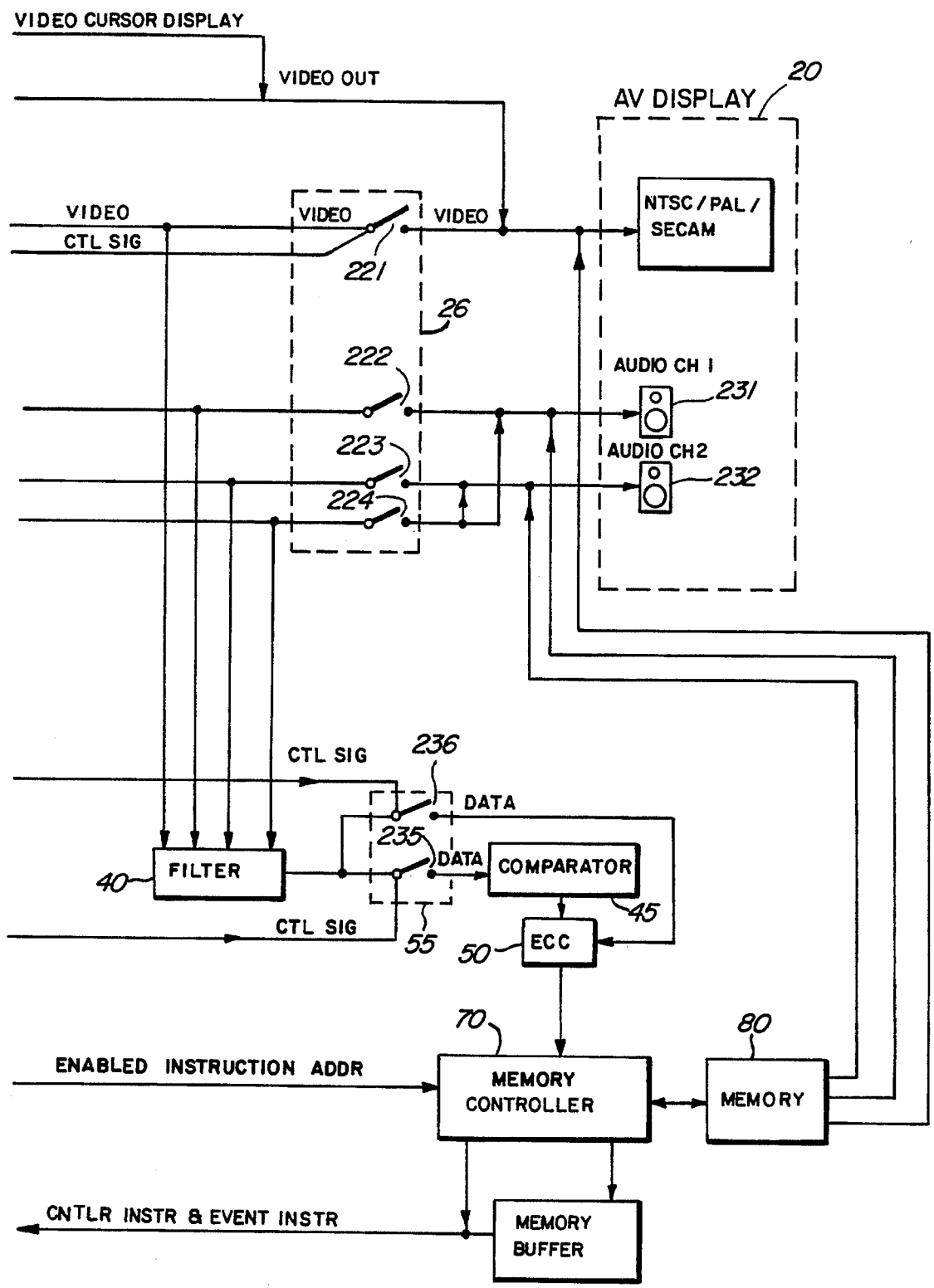

FIG. 4 sets forth a more detailed block diagram of the present invention interactive laser disc system. A laser disc player 11 constructed in accordance with general fabrication techniques receives a laser disc 17. In accordance with an important aspect of the present invention, laser disc 17 has a plurality of event and instruction data segments stored thereon. For purposes of illustration, a simplified data arrangement 250 typical of the data arrangements of segments upon laser disc 17 is shown in FIG. 4. Thus, data segment 250 includes a disc lead in portion 251 which in accordance with conventional fabrication techniques provides information for initializing laser disc player 11. Thereafter, a data portion 252 comprises the event and instruction data of the present invention system. A segment 253 supports typical program material such as audio and visual data. Thereafter, a lead out segment 254 completes the data segment and operates in accordance with conventional fabrication techniques to configure laser disc player 11 for the completion of the data segment.

Laser disc player 11 includes a filter 200 configured to suppress frequency modulated information coupled to a video demodulator 201, the output of which is coupled to video output 12 of laser disc player 11 by a switch 205. A conventional drop out detector 202 is coupled to filter 200 and controls switch 205. In further accordance with conventional fabrication techniques, laser disc player 11 includes a delay circuit 203 having a delay of one horizontal scan line, the output of which is coupled to a video demodulator 204 which in turn is coupled to switch 205. Thus, upon the detection of an information dropout at detector 202, switch 205 is switched from video demodulator 201 to a horizontal line delayed demodulator output from demodulator 204. In essence, this circuit facilitates the repetition of a horizontal scan line in the event information is temporarily lost. In further accordance with conventional fabrication techniques, laser disc player 11 includes a microprocessor 209 which provides control and operation of laser disc player 11. Player 11 further includes a crystal controlled reference signal generator 210 utilized to control the rotation of laser disc 17 and a pair of audio channel demodulators 206 and 208 together with a noise reduction system 207.

An audio visual display 20 includes a conventional television receiver 230 and a pair of audio processing systems 231 and 232. A switch matrix 26 includes a plurality of switches 221 through 224 coupling the audio and video outputs of laser disc player 11 to audio visual display 20. A frame grabber 30 is coupled to the video output of laser disc player 11 and includes conventional frame grabbing and storing circuitry to produce a video output signal which is coupled to television receiver 230.

A controller 60 is operatively coupled to microprocessor 209 of laser disc player 11 and is utilized to control the operation of player 11 in accordance with the present invention. A character and cursor generator 64 includes a video screen cursor control and cursor coordinate circuit 240 together with an enable generator 241. Enable generator 241 is operatively coupled to controller 60. A user control 242 comprising a generally conventional remote control unit is operatively coupled by an infrared coupling system to cursor control circuit 240 and controller 60.

Controller 60 cooperates with user control 242 and cursor control 240 to present the user with a plurality of on-screen option choices in the manner described above. User control 242 is manipulated by the user to move the generated cursor produced by cursor control circuit 240 to a selected coordinate upon the displayed image of television receiver 230 to provide user option selection input information. Controller 60 responds to the user commands provided by user control 242 in the manner described above.

Controller 60 produces a control signal which is applied to frame grabber circuit 30 via switch 220 and switch 221 of switch matrix 26 to facilitate the presentation of a predetermined image frame upon television receiver 230 during the option presentation process. Concurrently, controller 60 operates switch 237 which couples the cursor generated by cursor control circuit 240 to the video output of frame grabber 30 for eventual display upon television receiver 230. Thus, each time controller 60 receives an instruction from laser disc player 11, controller 60 executes the instruction and holds a predetermined image frame upon television receiver 230 using frame grabber 30 and presents a movable cursor and user option selection as part of the visual display of television receiver 230. A reference clock 211 provides a reference timing signal for controller 60 and other portions of the system.

Filter 40 is coupled to video output 12 and audio outputs 13 through 15 of laser disc player 11. The output of filter 40 is coupled to a bypass switch circuit 55 having a pair of switches 235 and 236 therein. Controller 60 is coupled to switches 235 and 236 to selectively apply the output of filter 40 either directly to comparator 45 or directly to error correction circuit 50. As described above, instruction data is repeated three times upon laser disc 17 while audio and visual data is not redundant. Accordingly, in the manner described above, controller 60 operates switches 235 and 236 to bypass comparator 45 during the coupling of audio visual data and to couple the instruction data directly to comparator 45. Comparator 45 examines the triplicate instruction data and couples the instruction data to error correction circuit 50 so long as any two of the three triplicate instructions are identical. In the event no two instructions are identical, comparator 45 shuts down the operation of the system to avoid erroneous instruction information being processed. Error correction circuit 50 applies conventional error correction techniques to further process the instruction and audio visual data for application to memory controller 70. Memory controller 70 operates under the control of controller 60 and transfers the instruction data and audio and visual data to memory 80 in preparation for the user's exercise of a selection in response to the above-described option screen presentation using memory buffer 75. In the preferred fabrication of the present invention system, controller 60 operates laser disc player 11 to read the instruction data and audio and visual data from disc 17 corresponding to the possible options selectable by the user in response to the presented option screen. Thus, memory 80 receives and stores each of the possible audio and visual data needed for response to the user's selection. Once the user has selected one option from the presented options, controller 60 operates memory controller 70 to output the appropriate audio and visual information from memory 80 to be utilized by audio visual display 20.

Thus, the present invention system utilizes a controller for operation of the laser disc player to periodically read the necessary data from the laser disc player for temporarily storage within the controller memory. The controller further operates a frame grabber and cursor and character generator to provide a single frame of image together with a movable cursor and option selections upon the video display. The controller then responds to the user input commands and cursor movement to determine the option selected by the user. In response to the selected option, the controller then accesses the controller memory to output the appropriate sequence of events to fulfill or respond to the user's selection. Once the series of events has been properly displayed, the controller then actuates the laser disc player to begin reading the next instruction set and the cycle repeats to produce the desired interactive operation of the present invention system.

Figure 5:
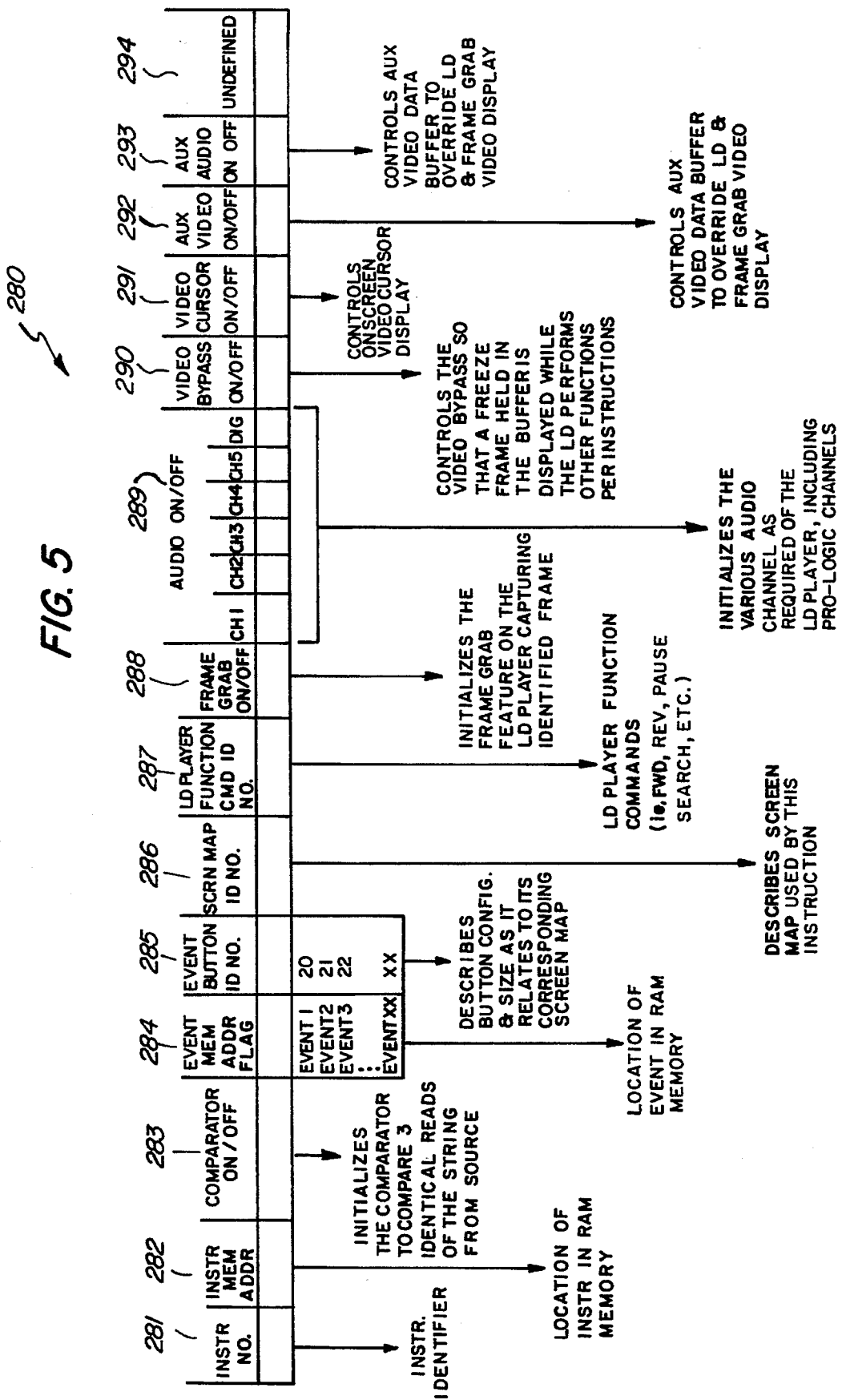
FIG. 5 sets forth a sample controller instruction string utilized in the present invention interactive laser disc system.

FIG. 5 sets forth a sample diagram of a typical controller instruction string generally referenced by numeral 280. Instruction string 280 begins with an instruction number 281 which identifies the particular instruction. Instruction string 280 then includes an instruction memory address 282 which indicates the memory location of the instruction followed by a comparator on/off portion 283 which initializes the comparator to compare the three identical instruction strings for instruction validity. An event memory flag 284 indicates the location of the event to be used in memory followed by an event button identification number 285 which describes the button configuration location and size as it relates to the option screen presentation. Instruction string 280 further includes a screen map identification number 286 which describes the image screen map used in combination with this particular instruction. Next, a laser disc player function command identification number 287 is provided which is utilized in operating the laser disc player using conventional laser disc player commands such as forward, reverse, pause, search, etc. A frame grab on/off portion 288 initializes the frame grabber feature of the laser disc player and is utilized for capturing an identified frame such as that used in presentation of a user option. An audio on/off portion 289 initializes the various audio channels as required on the laser disc player. A video bypass on/off portion 290 controls the video bypass of the present invention interactive system such that a freeze frame held in the controller memory buffer is displayed while the laser disc performs other functions in response to instructions. A video cursor on/off portion 291 controls the on-screen video cursor display. An auxiliary video on/off portion 292 controls auxiliary video data to override the laser disc and frame grabber video display. An auxiliary audio on/off 293 controls auxiliary audio data override of the laser disc player audio. A final section 294 remains unused and is available for additional functional activity.

Thus, as can be seen, the entire instruction string provides the information necessary for the controller to properly configure the present invention system and to facilitate the interactive operation of the system.

Figure 6:
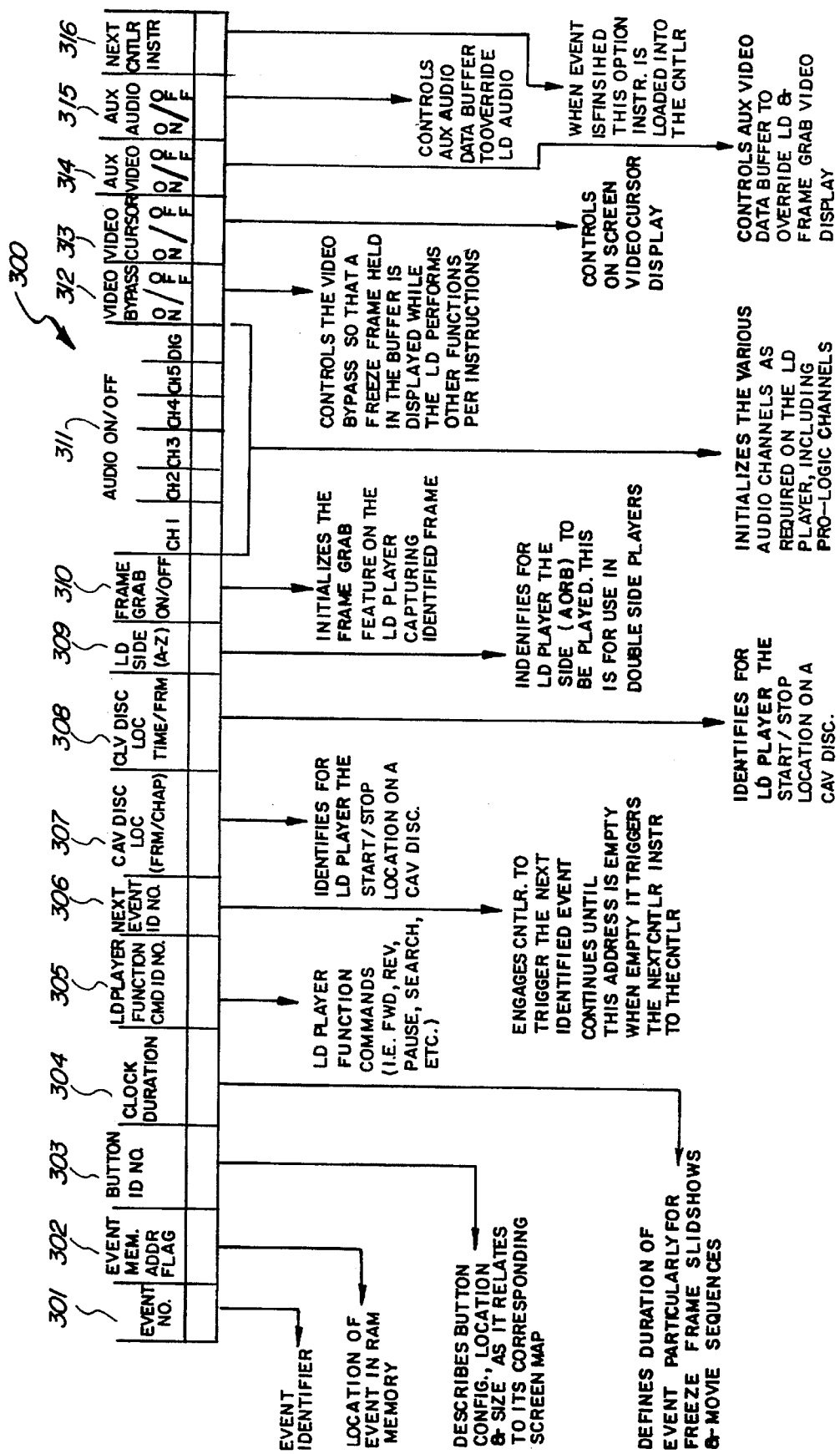
FIG. 6 sets forth a sample event instruction string utilized in the present invention interactive laser disc system.
Figure 7:
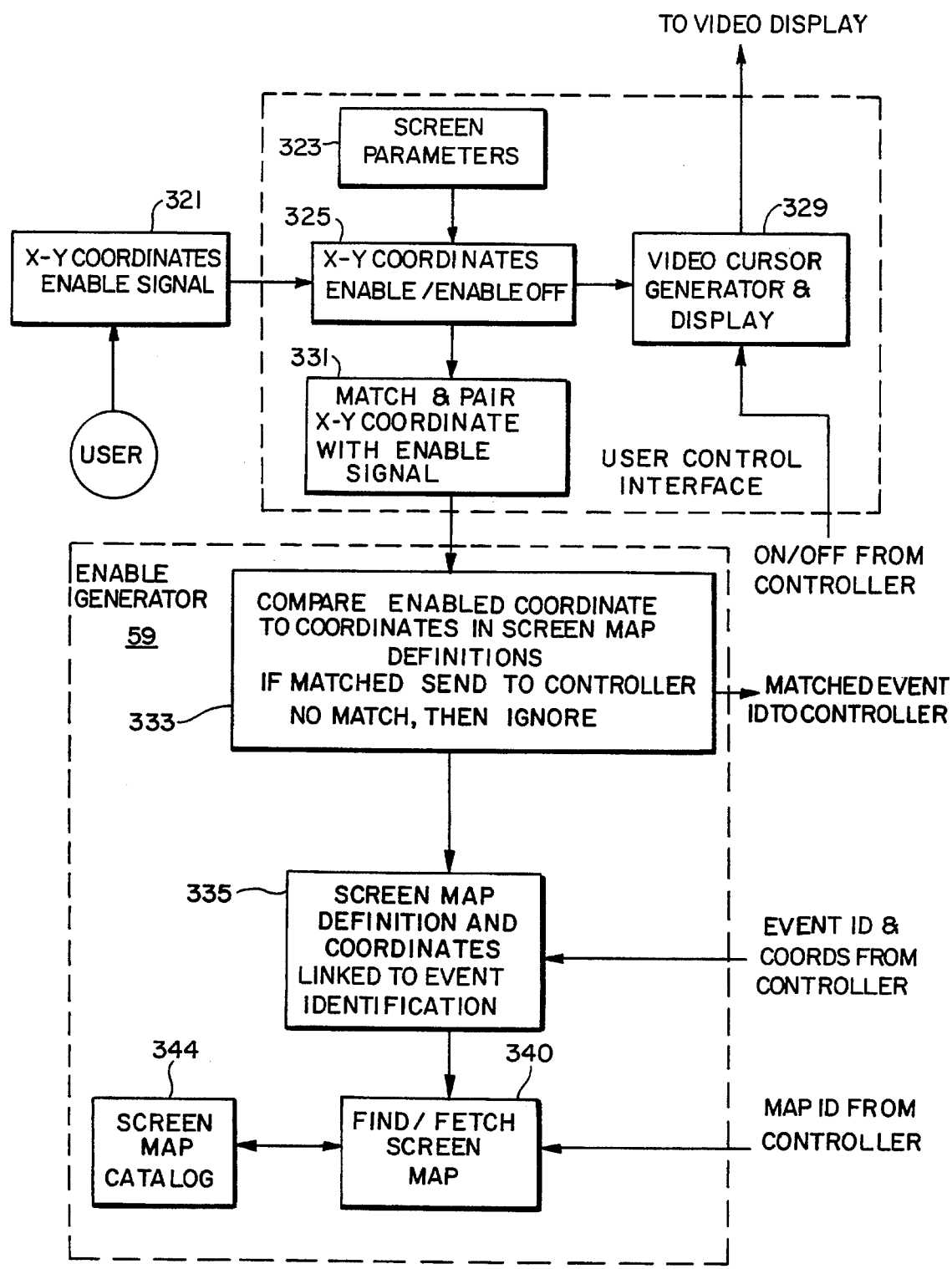
FIG. 7 sets forth a flow diagram of the user input, user control interface and enable generator of the present invention system.

FIG. 6 sets forth an event instruction string configured in accordance with the present invention and generally referenced by numeral 300. Event instruction string 300 begins with an event number 301 which identifies the particular event followed by an event memory address flag 302 which indicates the location of the event within the memory. A button identification number 303 describes the button configuration location and size as it relates to its corresponding screen map in the user selection display. A clock duration portion 304 defines the duration of the particular event. A laser disc function command identification number portion 305 provides communication of laser disc player function commands such as forward, reverse, pause, search, etc. A next event identification number 306 provides activation of the controller to trigger the next identified event. In response to segment 306, the controller continues until this address is empty within the event instruction string indicating the completion of the event string and causing the controller to read the next controller instruction. Event instruction string 300 further includes a CAV (constant angular velocity) disc location frame and chapter identifier 307 which is utilized to identify the laser disc player stop/start location on a CAV formatted disc. String 300 also includes a CLV (constant linear velocity) disc location time and frame 308 which identifies the start/stop location for the laser disc player upon a CLV formatted disc. Next, a laser disc side portion 309 identifies the laser disc side to be played to accommodate double side laser disc players. A frame grab on/off portion 310 initializes the frame grabber feature on the laser disc player capturing the identified frame. An audio on/off portion 311 initializes the various audio channels as required on the laser disc player. A video bypass on/off portion 312 controls the video bypass such that a freeze frame held in the memory buffer is displayed while the laser disc performs other functions in response to instructions. A video cursor on/off portion 313 controls on-screen video cursor display. An auxiliary video on/off portion 314 controls auxiliary video data to override the laser disc and frame grab video display. An auxiliary audio on/off portion 315 controls the auxiliary audio data to override the laser disc audio. Finally, a next controller instruction portion 316 indicates the completion of the event and causes the controller to load the next event into memory.

Initially, the user 346 operates a user control 321 which has standard X–Y coordinate standards and an enable signal interface standard.

User control 321 sends a constant stream of cursor X-Y coordinates to the user control interface 64 using conventional fabrication techniques. User control 321 also sends a trigger enable signal activated at the user's discretion at step 331.

User interface control 64 constantly monitors the user control X-Y coordinates and enable signal. The X-Y coordinates are monitored against predefined ratio limitations at screen parameters step 323 and is defined within the industry NTSC video ratios and resolution standards (4:3 ratio, 640×480 pixels).

The screen cursor X-Y coordinates at step 327 are used to control the video cursor generator and display component at step 329. The video cursor generator and display at step 329 is used by the system's video display. This transfer is operated under the control of controller 60.

When the user initiates an enable signal at step 321, the cursor X-Y coordinates and the enable signal are matched at step 331, paired then sent to an enable generator at step 333.

It should be noted with reference to FIG. 1 that enable generator 59 is made up of several components including an enable generator comparator, a screen map catalog, and an event and map comparator.

The enable generator receives an enabled cursor X-Y coordinate from the user interface control 64. The enable generator is preloaded with events identification and their defined coordinates from controller 60. The enable generator is engaged from the controller and loaded with data from the screen map catalog and data which is then sent to the map comparator.

The enabled coordinates are compared and matched to a loaded map from the controller which holds defined coordinates. If the coordinates are validated by the comparator against an event list from the controller, the matched event is sent to the enable generator comparator and is sent back to the controller for execution.

The screen map catalog maintains a library of predefined, and configurable, options which define active X-Y coordinates within the NTSC defined screen ratio. The controller sends the screen map catalog data that defines a given map identification. That map data is sent to the enable generator.

What has been shown is an interactive laser disc system utilizing a controller and controller memory in combination with a laser disc player to provide interactive capability without the use of an extensive central processing unit. The controller operates in response to a series of controller instructions and events to periodically read data from the laser disc player and to temporarily store a plurality of event segments within a controller memory while presenting a viewer selection option upon the audio video display. The controller memory holds the various events selectable by the user for immediate display once the user has actuated a user option. The system avoids the prior art need for reading the entire laser disc and for handling large portions of stored information using complex central processing units.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An interactive laser disc system comprising:

a laser disc having a plurality of data segments stored thereon each having an instruction data portion each of which includes a multiple number of identical instructions repeated in succession and an event data portion including pluralities of audio visual events, said data segments being associated into groups of alternative user options;

a laser disc player having means for receiving said laser disc and recovering said data segments therefrom;

display means for producing an audio visual display;

a controller having a controller memory for controlling the operation of said laser disc player and for presenting a plurality of user choice options upon said display means and for storing a group of said data segments in said controller memory;

a comparator for examining each data segment and matching said identical instructions;

input means for receiving a user choice from among said options; and said controller responding to said user choice to retrieve a corresponding one of said data segments from said controller memory and applying it to said display means thereby providing an interactive display.

2. An interactive laser disc system as set forth in claim 1 further including a filter interposed between said laser disc player and said comparator to distinguish between said instruction data portions and said event data portions of said data segments.

3. An interactive laser disc system as set forth in claim 2 further including bypass means coupled in parallel with said comparator responsive to said filter and said controller to apply said instruction data portions to said comparator and to bypass said event data portions around said comparator.

4. An interactive laser disc system as set forth in claim 3 further including an error correction circuit having a first input coupled to said comparator, a second input coupled to said bypass means and an output coupled to said controller memory.

5. An interactive laser disc system as set forth in claim 4 wherein said multiple number of identical instructions is three.

6. An interactive laser disc system as set forth in claim 5 wherein said comparator applies one of said identical instructions to said error correction circuit solely in response to at least two of said three instructions forming a match.

7. An interactive laser disc system as set forth in claim 6 further including a frame grabber circuit coupled to said laser disc player responsive to said controller for applying a selected image frame to said audio visual display each time said controller presents a plurality of user choice options.

8. An interactive laser disc system as set forth in claim 7 having a plurality of controller responsive switches coupling said laser disc player to said audio visual display.

9. An interactive laser disc system as set forth in claim 1 wherein said multiple number of identical instructions is three.

10. An interactive laser disc system as set forth in claim 1 having a plurality of controller responsive switches coupling said laser disc player to said audio visual display.

11. For use in combination with a laser disc having a plurality of data segments stored thereon each having an instruction data portion and an event data portion, an interactive laser disc system comprising:

a laser disc player having means for receiving said laser disc and recovering said data segments therefrom;

an audio visual display coupled to said laser disc player;

a filter coupled to said laser disc player;

a comparator coupled to said filter examining said instruction data portion of said data segments;

an error correction circuit coupled to said comparator;

a selective bypass coupled between said filter and said error correction circuit;

a controller coupled to said laser disc player and said selective bypass;

a controller memory coupled to said controller; and a user input coupled to said controller;

said controller being operative to present a multiple user selection display to said audio visual display and to store a corresponding plurality of event data portions associated with said multiple options in said controller memory and to respond to a user option selection to transfer the corresponding event data portions from said controller memory to said audio visual display.

12. An interactive laser disc system as set forth in claim 11 wherein said instruction data portions of said data segments each include a multiple number of identical instructions repeated in succession and wherein said comparator examines each data segment for matching identical instructions.

13. An interactive laser disc system as set forth in claim 12 wherein said multiple number of identical instructions is three.

14. An interactive laser disc system as set forth in claim 13 wherein said comparator applies one of said identical instructions to said error correction circuit solely in response to at least two of said three instructions forming a match.

15. An interactive laser disc system as set forth in claim 14 further including a frame grabber circuit coupled to said laser disc player responsive to said controller for applying a selected image frame to said audio visual display each time said controller presents a plurality of user choice options.

16. An interactive laser disc system as set forth in claim 15 having a plurality of controller responsive switches coupling said laser disc player to said audio visual display.

* * * * *